United States Patent
Finn et al.

(10) Patent No.: US 9,445,418 B2
(45) Date of Patent: *Sep. 13, 2016

(54) BRIDGING WIRELESS AND WIRED MEDIA IN A COMPUTER NETWORK

(71) Applicant: Cisco Technology, Inc., San Jose, CA (US)

(72) Inventors: Norman W. Finn, Livermore, CA (US); Robert O'Hara, Santa Clara, CA (US); Rohit Suri, Fremont, CA (US); Joshua Broch, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,727

(22) Filed: Sep. 15, 2015

(65) Prior Publication Data

US 2016/0007349 A1    Jan. 7, 2016

Related U.S. Application Data

(63) Continuation of application No. 14/307,370, filed on Jun. 17, 2014, now Pat. No. 9,148,299, which is a continuation of application No. 13/589,695, filed on Aug. 20, 2012, now Pat. No. 8,774,077, which is a continuation of application No. 12/020,331, filed on Jan. 25, 2008, now Pat. No. 8,315,197.

(51) Int. Cl.
*H04W 72/04* (2009.01)
*H04W 4/16* (2009.01)
*H04L 12/46* (2006.01)
*H04W 88/08* (2009.01)
*H04W 92/02* (2009.01)

(52) U.S. Cl.
CPC ........ *H04W 72/0446* (2013.01); *H04L 12/462* (2013.01); *H04W 4/16* (2013.01); *H04W 72/0406* (2013.01); *H04W 72/0426* (2013.01); *H04W 88/08* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 7,194,622 B1 | 3/2007 | Halasz et al. | |
| 7,221,750 B2 | 5/2007 | Brahmbhatt et al. | |
| 7,257,105 B2 | 8/2007 | Molteni et al. | |
| 7,301,924 B1 | 11/2007 | Gurbuz et al. | |
| 7,319,864 B2 | 1/2008 | Jagadeesan et al. | |
| 2004/0185845 A1* | 9/2004 | Abhishek ............. | H04W 88/08 455/422.1 |
| 2005/0201342 A1 | 9/2005 | Wilkinson et al. | |
| 2006/0253747 A1 | 11/2006 | Gillies et al. | |
| 2006/0268715 A1 | 11/2006 | Zuniga et al. | |

(Continued)

*Primary Examiner* — Christine Duong
(74) *Attorney, Agent, or Firm* — Polsinelli PC

(57) ABSTRACT

In one embodiment, a transmitting node may be configured to transmit a wireless advertisement frame over a computer network, wherein the frame includes a source address of a reachable node being advertised, a destination address to which the reachable node is to be advertised, a transmitter address of the transmitting node, and a receiver address of a wireless access point to which the wireless advertisement frame is to be received. Also, the wireless access point may be configured to receive the wireless advertisement frame from the network, and in response, transmit a reflected wireless advertisement frame having the source address of the reachable node, the destination address to which the reachable node is to be advertised, a transmitter address of the access point, and a receiver address that indicates the reflected frame is to be accepted by any appropriate receiver excluding the transmitting node.

20 Claims, 7 Drawing Sheets

(56) References Cited

U.S. PATENT DOCUMENTS

| | | |
|---|---|---|
| 2007/0004400 A1 | 1/2007 | McClung |
| 2007/0081482 A1 | 4/2007 | Roh et al. |
| 2007/0104199 A1 | 5/2007 | Taha |
| 2007/0147284 A1 | 6/2007 | Sammour et al. |
| 2007/0165592 A1 | 7/2007 | Gossain et al. |
| 2007/0189249 A1 | 8/2007 | Gurevich et al. |
| 2007/0248067 A1 | 10/2007 | Banerjea et al. |
| 2008/0084847 A1 | 4/2008 | Xia et al. |
| 2008/0186914 A1 | 8/2008 | Na |
| 2008/0205385 A1 | 8/2008 | Zeng et al. |
| 2008/0232383 A1 | 9/2008 | Meier et al. |
| 2009/0003298 A1 | 1/2009 | Chu et al. |
| 2009/0061881 A1 | 3/2009 | Gonsa et al. |

* cited by examiner

BRIDGING WIRELESS AND WIRED MEDIA IN A COMPUTER NETWORK

RELATED APPLICATIONS

The present application is a continuation of U.S. patent application Ser. No. 14/307,370, titled "BRIDGING WIRELESS AND WIRED MEDIA IN A COMPUTER NETWORK," filed Jun. 17, 2014, which is a continuation of U.S. patent application Ser. No. 13/589,695, titled "BRIDGING WIRELESS AND WIRED MEDIA IN A COMPUTER NETWORK," filed Aug. 20, 2012, which is a continuation of U.S. patent application Ser. No. 12/020,331, titled "BRIDGING WIRELESS AND WIRED MEDIA IN A COMPUTER NETWORK," filed on Jan. 25, 2008, the contents of which are incorporated herein by reference in their entirety.

TECHNICAL FIELD

The present disclosure relates generally to computer networks, and, more particularly, to bridging wireless and wired media in a computer network.

BACKGROUND

Computer networks and home entertainment networks are beginning to see the emergence of an arbitrary collection of devices with Ethernet interfaces, some hard-wired and some wireless. For example, networks may interconnect a variety of different protocol-based stations or devices, such as in accordance with IEEE Std. 802.3 (physical), IEEE Std. 802.11 (wireless), Multimedia over Coax Alliance (MoCA), Ether/DSL (Digital Subscriber Line), etc. In particular, a wireless station attached to an access point may, itself, be a bridge to other wireless and/or wired media. That is, a wireless device may interconnect with a network wirelessly, and may act as a bridge to other wireless/wired devices so those devices may also be interconnected with the network.

In the event, however, that an 802.11 wireless station is also a bridge, it cannot work properly within defined standards of the network. One reason is that the access point reflects all broadcasts (e.g., advertisements) issued by a station back to all stations on the wireless medium. A station that is not a bridge can discard the reflected broadcast based on the presence of its own source address in the frame. However, a wireless station that is also bridge is unable to determine that the reflections originated at itself. As such, the wireless bridges are unable to determine whether to suppress the reflection as its own advertisement, or to learn that a device that may have been coupled to (i.e., located behind) the wireless bridge has moved to a new location in the network.

Various workarounds to this problem have lead to various anomalies in the behavior of the network. For instance, there may be extended losses of connectivity (e.g., five minutes), where no such loss would occur in an all-wired network. Also, there may be excessive flooding of unknown frames (causing possible loss of quality guarantees), as well as duplicate delivery of multicasts and/or flooded unicasts in situations where there would be none in an all-wired network. Certain proprietary protocols may be used to overcome these issues, such as the successive transmission of broadcasts from the access point individually to each wireless station, instead of one broadcast to all stations. However, such proprietary protocols do not conform to industry standards (e.g., IEEE standards), and thus are not widely available to networks other than those executing the specific proprietary protocols.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
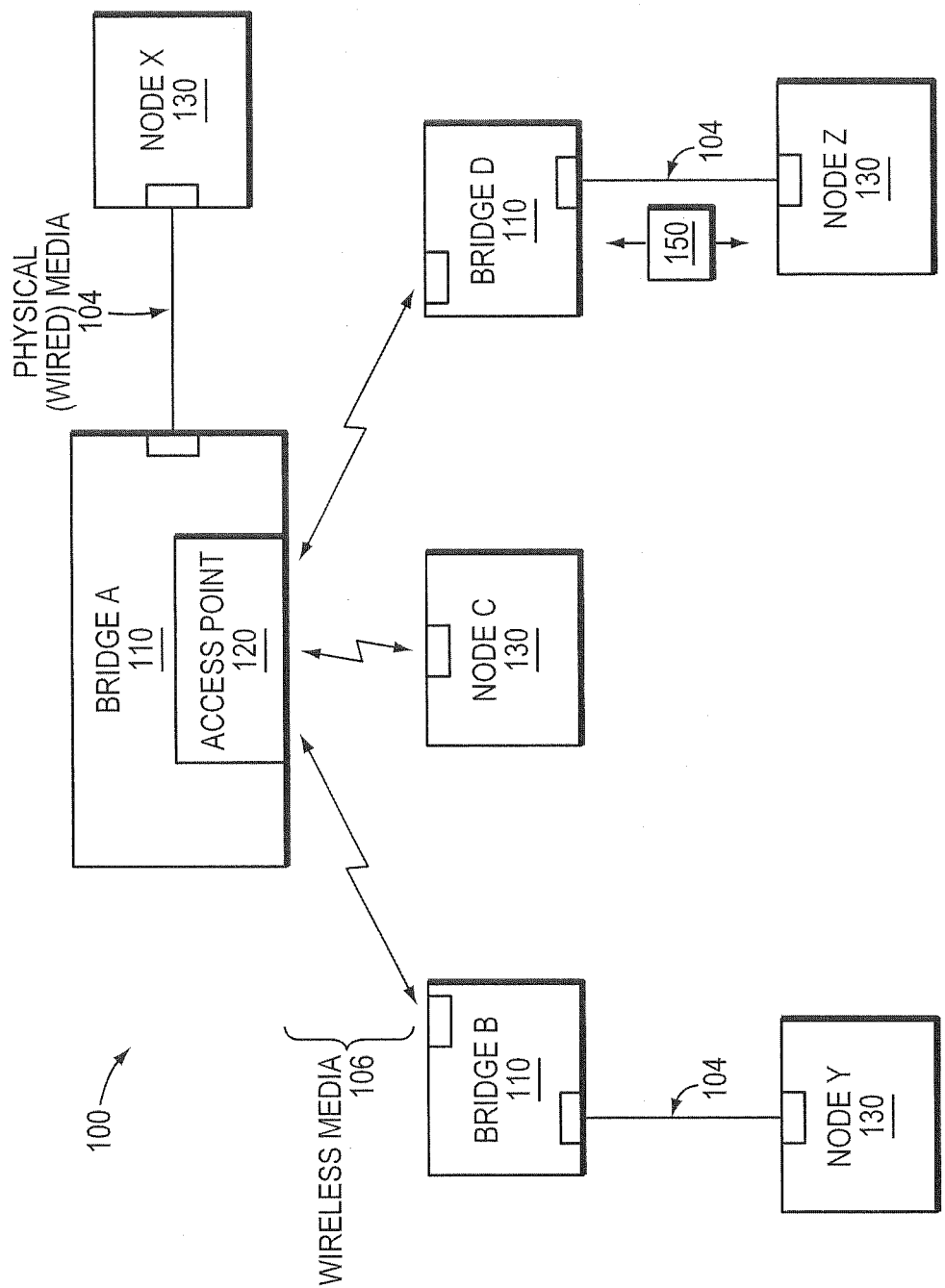
FIG. 1 illustrates an example computer network.

According to embodiments of the disclosure, a transmitting node may be configured to transmit a wireless advertisement frame over a computer network, wherein the frame includes a source address of a reachable node being advertised, a destination address to which the reachable node is to be advertised, a transmitter address of the transmitting node, and a receiver address of a wireless access point to which the wireless advertisement frame is to be received. Also, the wireless access point may be configured to receive the wireless advertisement frame from the network, and in response, transmit a reflected wireless advertisement frame having the source address of the reachable node, the destination address to which the reachable node is to be advertised, a transmitter address of the access point, and a receiver address that indicates the reflected frame is to be accepted by any appropriate receiver excluding the transmitting node.

Description

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge may be used to provide a "bridging" function between two or more LANs or end stations. Typically, the bridge is a computer and includes a plurality of ports that are coupled to the LANs or end stations. Ports used to couple bridges to each other are generally referred to as a trunk ports, whereas ports used to couple bridges to LANs or end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer 2 (L2) which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the bridging function, L2 bridges examine the MAC destination address of each data frame received on a source port. The frame is then switched onto the destination port(s) associated with that MAC destination address.

Other devices, commonly referred to as routers, may operate at higher communication layers, such as Layer 3 (L3) of the OSI Reference Model, which in Transmission Control Protocol/Internet Protocol (TCP/IP) networks corresponds to the Internet Protocol (IP) layer. Packets at the IP layer also include a header which contains an IP source address and an IP destination address. Routers or L3 switches may re-assemble or convert received data frames from one LAN standard (e.g., Ethernet) to another (e.g. token ring). Thus, L3 devices are often used to interconnect dissimilar subnetworks.

FIG. 1 is a schematic block diagram of an example computer network 100 illustratively comprising nodes/devices, such as bridges 110, one or more access points 120, and other devices 130, interconnected by links (physical 104 and wireless 106) as shown. For instance, Bridge A may be interconnected physically with device X, and may also act as an access point for wireless communication with Bridges B and D, and device C. Also, Bridge B may be physically interconnected with device Y, and Bridge D may be physically interconnected with device Z. Those skilled in the art will understand that any number of nodes, devices, links, etc. may be used in the computer network, and that the view shown herein is for simplicity. Those skilled in the art will also understand that while the embodiments described herein are described generally, they may apply to any network configuration within an Autonomous System (AS) or area, or throughout multiple ASes or areas, etc. The computer network 100 of FIG. 1 is meant for illustration purposes only and is not meant to limit the embodiments described herein.

Frames 150 may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. As such, each bridge includes one or more ports/interfaces for receiving and forwarding the network messages.

Figure 2:
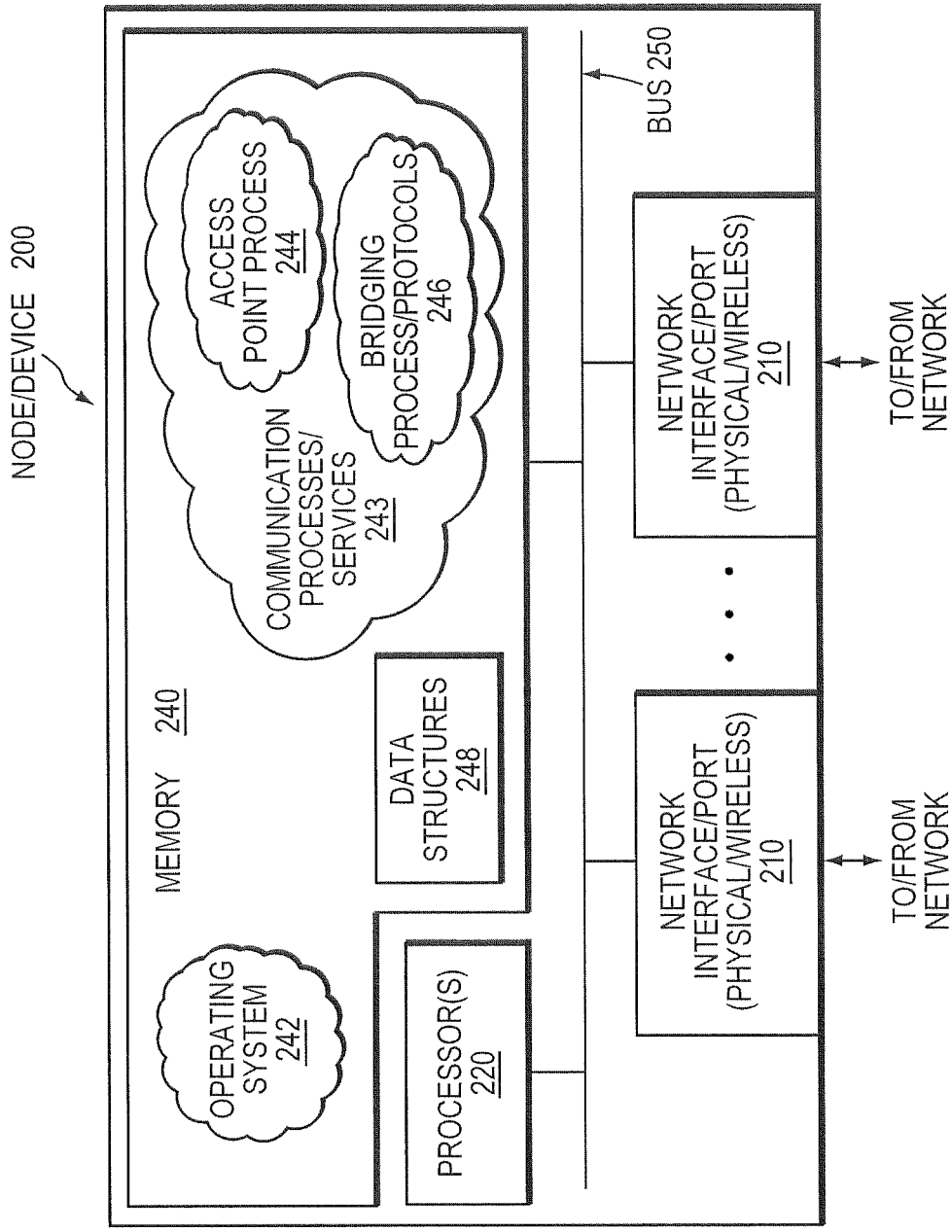
FIG. 2 illustrates an example network device/node.

FIG. 2 is a schematic block diagram of an example node/device 200 that may be advantageously used with one or more embodiments described herein, e.g., as a bridge 110, access point 120, and/or other device 130 (such as a wireless receiver). The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100. The network interfaces/ports 210 may be configured to transmit and/or receive data (frames 150) using a variety of different communication protocols over physical links or wireless links. For example, such communication protocols may include, inter alia, TCP/IP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames 150 within the network interfaces/ports 210 may conform to a protocol stack (not shown) that defines the functions performed by the data link and physical layers of a communications architecture.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and manipulate the data structures 248. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise communication process/services 243, access point process 244 (for access point 120), and bridging process/protocols 246 (for bridges 110). It will be apparent to those skilled in the art that other processor and memory means, including various computer-readable media, may be used to store and execute program instructions pertaining to the inventive technique described herein.

Communication process/services 243 contain computer executable instructions executed by the processors 220 to perform functions provided by one or more communication protocols, such as various switching or forwarding/routing protocols. These functions may be configured to manage switching databases (e.g., spanning tree instances, a data structure 248), filtering databases (FDBs, a data structure 248), or forwarding information databases (FIBs, a data structure 248) containing, e.g., data used to make switching/forwarding decisions. In particular, as part of communication process/services 243, wireless devices may utilize communication protocols set forth in various, e.g., standardized, wireless protocols, such as IEEE Std. 802.11. For instance, if a device is enabled to act as an access point 120 (e.g., Bridge A), then the device may have an access point process 244 directed to communicating wirelessly with one or more other wireless devices of the network 100. Also, any device in the network 100 that has more than one Ethernet interface (port 210) may be configured to act as a bridge in order to ensure connectivity between the devices, particularly where there may be many Ethernet-like links, such as 802.3, 802.11, MoCA, Ether/DSL, etc., as mentioned above. Accordingly, bridges 110 in the network may have corresponding bridging process/protocols 246, such as in accordance with IEEE Std. 802.1 (e.g., 802.1D and/or 802.1Q).

Notably, with an all-wired network (e.g., assuming for this example that wireless links 106 are physical links 104 in FIG. 1), current protocols, as will be understood by those skilled in the art, generally function as expected to advertise reachability. For instance, assume that Node Z sends out a broadcast message, which is received by Bridge D. Bridge D may then relay the broadcast to the shared physical medium (assume that access point 120 is a shared physical link between devices A, B, C, and D). Accordingly, Bridges A and B receive the broadcast, learn the direction to source Node Z, and relay the broadcast to Node X and Node Y, respectively. Node C also receives the broadcast as well. In particular, Bridge D does not see the broadcast frame reflected back towards itself. In this manner, should Node Z be moved to a new location, e.g., to where Node Y is located (behind Bridge B), then Node Z may send another broadcast, which Bridge B relays into the shared medium. Bridge D now receives a broadcast from Bridge B showing connectivity with Node Z, so Bridge D now knows that Node Z has moved, and learns the new direction to source Node Z, accordingly.

Figure 3A:
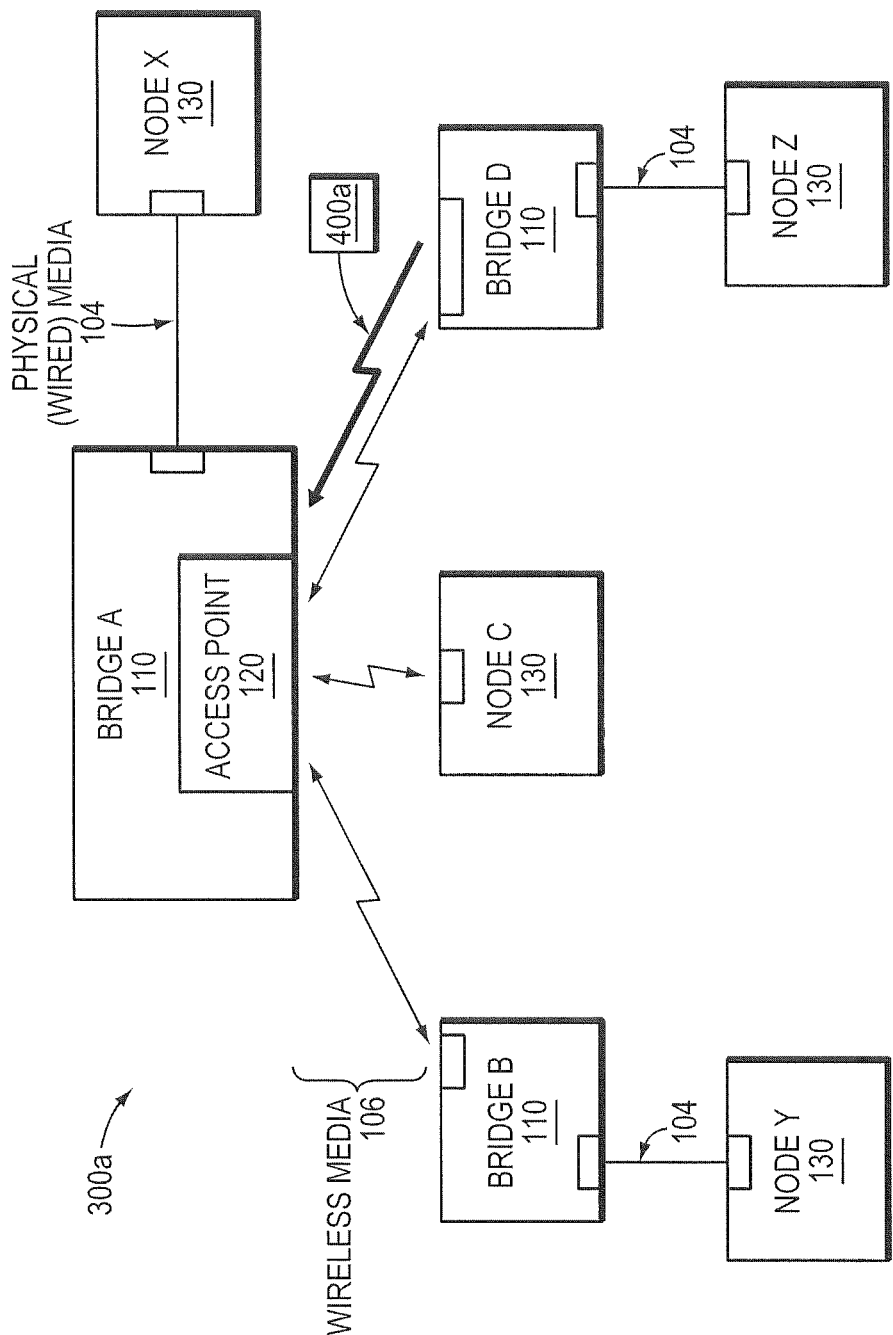
FIGS. 3A and 3B illustrate an example advertisement exchange.
Figure 3B:
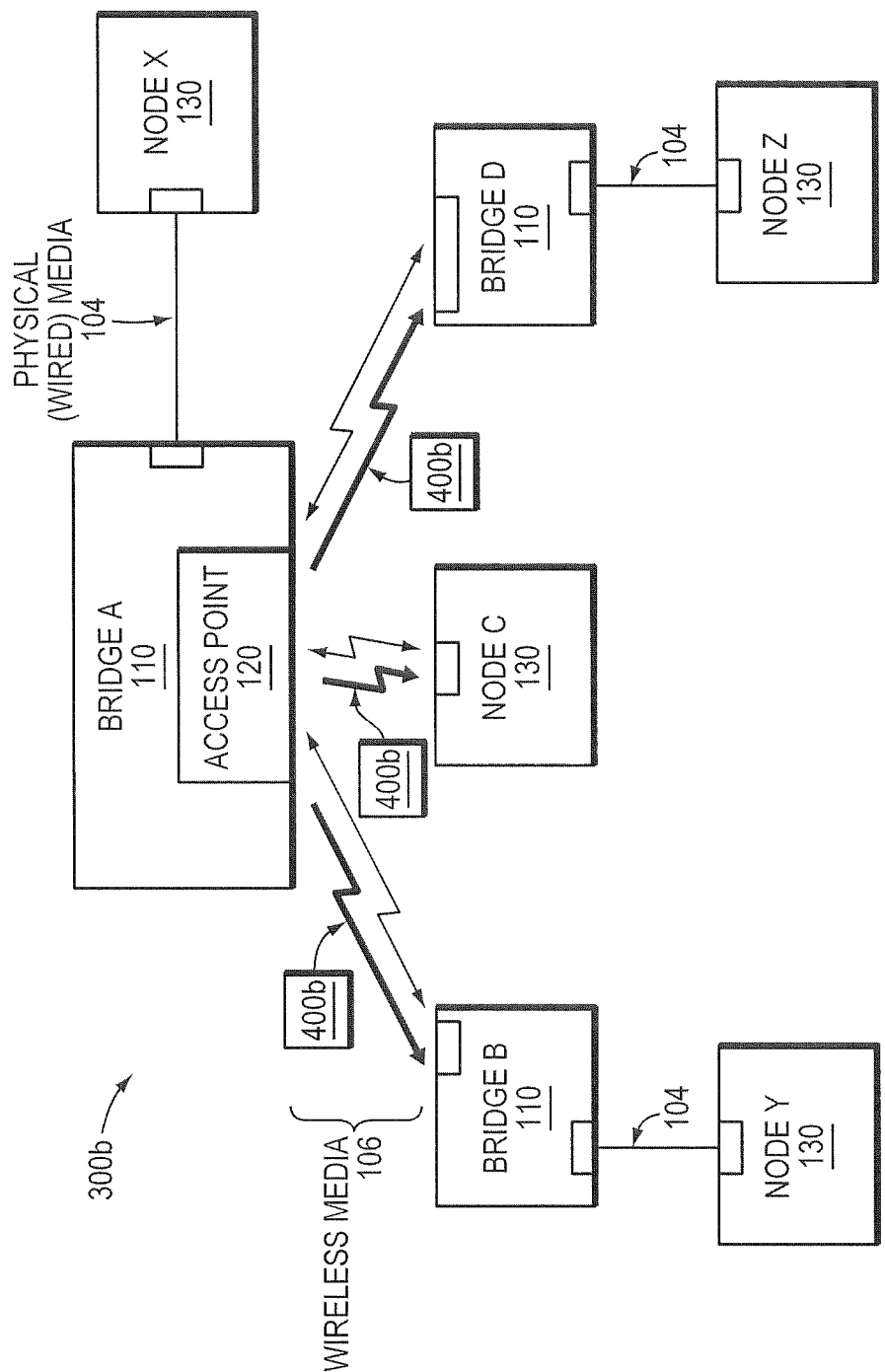

Based on a mixed-media network, however, such as the wired (104) and wireless (106) links in FIG. 1, various problems are presented during the situation described above. For example, assume again that Node Z sends out a broadcast message, which is received by Bridge D. Bridge D may then relay the broadcast wirelessly to the access point 120 on Bridge A (access point A). (FIG. 3A illustrates an example frame/advertisement exchange 300*a*.) The access point A reflects the received broadcast onto the wireless "links", which may be received by any wireless receiver, such as Bridge B, Node C, and also Bridge D. (FIG. 3B illustrates an example frame/advertisement exchange 300*b*.) Bridges A and B and Node C receive the broadcasts, and learn the direction to source Node Z. Since Bridge D receives the reflected broadcast frame, and since the wireless frame was originated by itself, Bridge D should suppress the frame. However, using current wireless protocols, Bridge D is unable to determine whether Node Z's broadcast is being reflected back from the access point, or that Node Z has moved and is being rebroadcast from a new Bridge (e.g., Bridge B). Specifically, a conventional three-address frame (not shown) may comprise the source address of the reachable node (e.g., Node Z), the destination address to which the reachable node is to be advertised (e.g., broadcast within the network 100), and the transmitter address of the access point (e.g., access point A). In other words, upon receiving the wireless advertisement frame from an access point 120, a bridge is currently unable to determine whether the advertised node is behind itself, or has moved. (Note that wireless devices that are not bridges have not had to address these concerns, e.g., Node C, as those wireless devices are only interconnected to the network 100 wirelessly through a single connection, i.e., do not share the same issues.)

As an illustration of a "real-world" network that may be affected by the above problems, assume that Node Z is a television (TV) with a single Ethernet port, and is playing a unicast program from a satellite receiver (e.g., Bridge D). If the TV is moved to another wired connection, e.g., to where Node X is located behind Bridge A, then the satellite receiver (Bridge D) may continue to send the unicast program to where the TV (Node Z) was previously, thus "blackholing" the program. One manner to inform the network 100 of the location change is to have Bridge A send a Topology Change Notification (TCN) when the TV associates with its new bridge (Bridge A itself), and all bridges unlearn (most of) their addresses. During a brief interruption until addresses are relearned, however, all traffic is flooded everywhere in the network 100, not just the satellite receiver's unicast program traffic. This wide-scale flooding of all traffic may result in glitches in the flows in the network (e.g., due to bandwidth saturation, as may be appreciated by those skilled in the art).

One solution to this problem is to not use the TCN, but instead send some broadcasts and/or multicasts (e.g., address resolution protocol, or "ARP" requests) from the moved TV (Node Z). These broadcast frames may be seen by the bridges in the network 100, and are used to relearn the node's (TV's) new location, thus alleviating the flooding bursts mentioned above. However, as mentioned above, when Bridge D (the satellite receiver) receives this broadcast, the bridge "thinks it knows" where the TV is (that is, behind itself), so it will suppress the broadcasts thinking they are reflections from a wireless access point. Because of this, nothing happens between the satellite receiver and the TV until a timeout occurs (e.g., a five-minute MAC table entry timeout), and the satellite starts flooding the unicast program again to find (relearn) the location of the TV. This additional period of disconnection between the satellite receiver and TV as well as the flooding of a satellite program into the entire network 100 is both cumbersome and inefficient. Unfortunately, there are currently no known solutions to these problems that are in accordance with current and/or standardized networking protocols.

Bridging Wireless and Wired Media

Currently, as mentioned above, IEEE Std. 802.11 wireless frames generally only use three address fields (e.g., source, destination, and transmitter addresses). However, there is a recent four-address format proposed for 802.11, which includes descriptions of each field, including an additional field designed to contain a receiver address indicating which devices should receive the associated frame. Although the frame format is defined, there is no specification in 802.11 of how stations or access points might use this format. According to one or more embodiments described herein, the four-address format may be used in a manner that is consistent with standardized protocols in the network (e.g., 802.1, 802.3, 802.11, etc.), and that alleviates the problems described above that are associated with mixed-media (wired and wireless) networks. In particular, in accordance with one or more embodiments herein, the receiver address within reflected advertisement frames from an access point 120 may comprise a special multicast address that indicates that all receivers except a particular receiver should accept the frame. In this manner, a bridge (e.g., Bridge D) may be able to distinguish between reflected frames originated by itself, or reflected frames originated by another bridge.

Illustratively, the techniques described herein may be performed by hardware, software, and/or firmware, such as various communication processes/services 243, e.g., in conjunction with access point process 244 (for access point 120) and bridging process 246 (for bridges 110). These processes and/or services may be configured to operate in accordance with certain protocols (e.g., standards, such as IEEE Stds. 802.1, 802.3, and 802.11), and in accordance with the techniques described herein to operate according to a four-address wireless advertisement frame.

Figure 4:
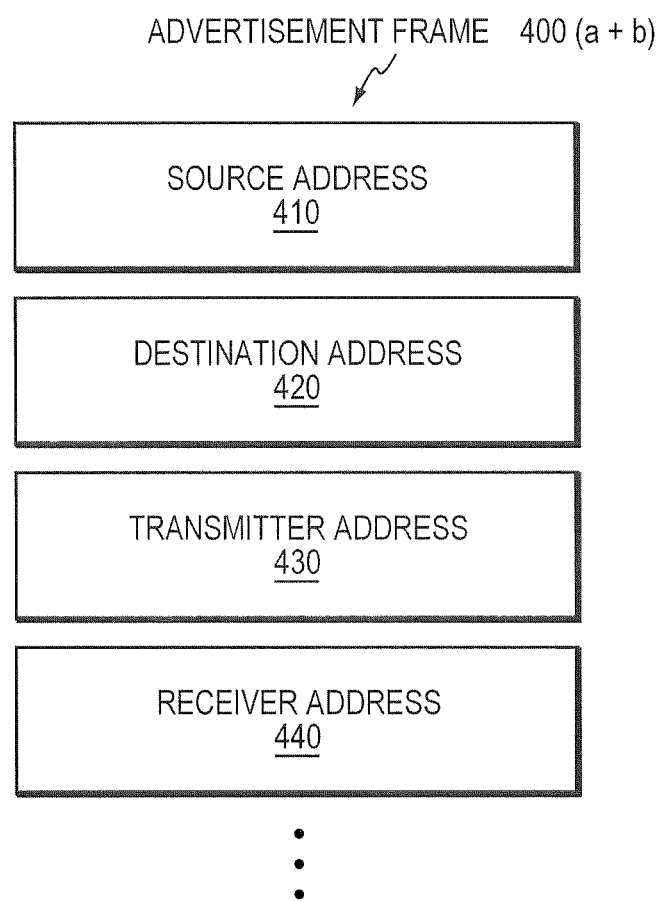
FIG. 4 illustrates an example advertisement frame.

In particular, FIG. 4 illustrates an example four-address frame format of a wireless advertisement frame 400 (a or b, described below). For instance, source address 410 generally contains the address of a reachable node being advertised in the frame (e.g., Node Z), and destination address 420 may contain an address to which the reachable node is to be advertised (e.g., broadcast, multicast, or unicast addresses), both such as in accordance with a bridged Ethernet frame, as will be understood by those skilled in the art. Also, in accordance with a wireless frame (802.11), a transmitter address 430 may contain an address of a transmitting node from which the wireless advertisement frame is sent/transmitted (e.g., depending on which device actually transmits the frame). In addition, a receiver address 440, as described herein, indicates which devices should receive the associated frame, as in accordance with the purpose of the receiver address field as defined by the IEEE (802.11).

Operationally, upon receiving a broadcast from a reachable node (e.g., Node Z), a wireless bridge (e.g., Bridge D) may transmit this broadcast (referred to herein as a wireless advertisement frame 400a) onto the wireless media 106 of the network 100 toward an access point 120 (e.g., access point A, see FIG. 3A). Specifically, the wireless Bridge D, a transmitting node, may populate the four addresses of a wireless advertisement frame 400a according to the description above. That is, illustratively, the source address 410 is Node Z, the destination address 420 is a broadcast, multicast, or unicast address (depending upon the desired breadth of advertisement), and the transmitter address 430 is the address of the transmitting node, Bridge D. In addition, the receiver address 440 for frame 400a is a unicast address of the access point A.

The wireless access point A may then receive the advertisement frame 400a, and may distribute the advertisement to other interconnected nodes in the network 100. For instance, if the wireless access point 120 is interconnected with one or more nodes via physical wires (e.g., Node X), then the wireless access point 120 (also a bridge 110) may transmit a wired advertisement frame (not shown) having the source address of the reachable node, the destination address to which the reachable node is to be advertised, and the transmitter address of the access point (that is, in accordance with 802.3 Ethernet). In addition, access point process 244 of the access point may be configured to transmit a "reflection" or "reflected" wireless advertisement frame (400b) into the network over wireless links 106 in order to wirelessly relay the received advertisement (e.g., from Bridge D).

Particularly, from the access point 120 (e.g., access point A), the reflected wireless advertisement frame 400b (see FIG. 3B) may again be transmitted with the four-address format of FIG. 4. However, reflected frame 400b from the access point 120 may modify the address fields accordingly. For instance, while the source address 410 and destination address 420 may remain the same as in frame 400a, the transmitter address 430 is changed to the address of the access point. (Note that a unicast address itself may be broadcast in address 420 when the unicast address location within the network is unknown, as will be appreciated by those skilled in the art.) In addition, in accordance with one or more embodiments described herein, the receiver address 440 of the reflected wireless advertisement frame 400b may indicate that the reflected frame is to be accepted by any appropriate receiver excluding the transmitting node (e.g., all except Bridge D, from transmitting address 430 of frame 400a). In other words, the receiver address 440 is a special (e.g., multicast) address meaning "everyone except station X should accept this frame," where station X in this example is the transmitting node, Bridge D.

Illustratively, the receiver address 440 in the reflected frame 400b may indicate any appropriate receiver excluding the transmitting node by combining a range of multicast addresses along with an association identifier (AID) of the transmitting node. For instance, the receiver address 440 may be a fixed "OUI" (organization/company ID, or alternatively, an "OID") supplied by proprietary ownership or, if standardized, by the IEEE (802.1 or 802.11), representing a multicast address for nodes that are to receive the advertisements, plus the AID of "station X" (e.g., Bridge D). Generally, the AID is a 16-bit integer that is obtained by the transmitting node (Bridge D) as a part of associating with the access point 120. An illustrative address field is 48 bits long (6 bytes), where the upper 22 bits are the OUI, and the lower 24 bits remain for specific use by an organization/standard committee. If the AID consumes the lower 16 bits of the field, then the upper 32 bits may be used to represent a fixed range of multicast MAC addresses (proprietary or standardized) to which receivers may subscribe.

As such, an appropriate receiver configured to receive advertisements regarding the reachable node (e.g., a wireless receiver in communication with access point A) may be configured to subscribe to (accept) multicast addresses (e.g., all) corresponding to receiving advertisements regarding the reachable node, except for those with the receiver's own AID. For instance, Bridge B, Bridge D, and Node C may each be configured to receive traffic for multicast addresses transmitted by access point A, and to accept the reflected wireless frames 400b from the access point A. However, should any of the receivers (particularly Bridge B or Bridge D) determine that it is excluded from a particular frame, e.g., determining that its specific AID is located within the receiver address 440 (at a location used to designate excluded addresses), then that receiver may ignore or otherwise suppress the received frame 400b (e.g., Bridge D).

Notably, for broadcasts or multicasts originated by the bridge 110 that is the access point 120 (e.g., A), no other device need be notified to suppress the advertisement 400b. Accordingly, the receiver address 440 may be either a special AID value indicating the access point (access point A's AID), the broadcast address, or not present (that is, using the three-address format). In this manner, any receiving device may accept the frame, where the frame still conforms to the embodiments described herein.

Moreover, there may be network configurations that have one or more devices that are not configured to accept/understand recent four-address frames 400 as described above. That is, these devices may be configured to only accept previous three-address frames. Accordingly, the wireless access point (bridge A) may determine that one or more receivers in the network 100 are unable to parse four addresses in a reflected wireless advertisement frame 400b, such as through a simple configuration (e.g., a 'yes' or 'no' configuration) or more complex dynamic discovery techniques. In response to having such devices, the wireless access point may broadcast the four-address frame 400b as described above, and may also broadcast a conventional three-address frame. For instance, a conventional three-address frame (not shown) may comprise the source address of the reachable node (e.g., 410), the destination address to which the reachable node is to be advertised (e.g., 420), and the transmitter address of the access point (e.g., 430). By transmitting both three- and four-address frames, both types of devices receive an advertisement, and each type may ignore/discard the other's advertisements.

Figure 5A:
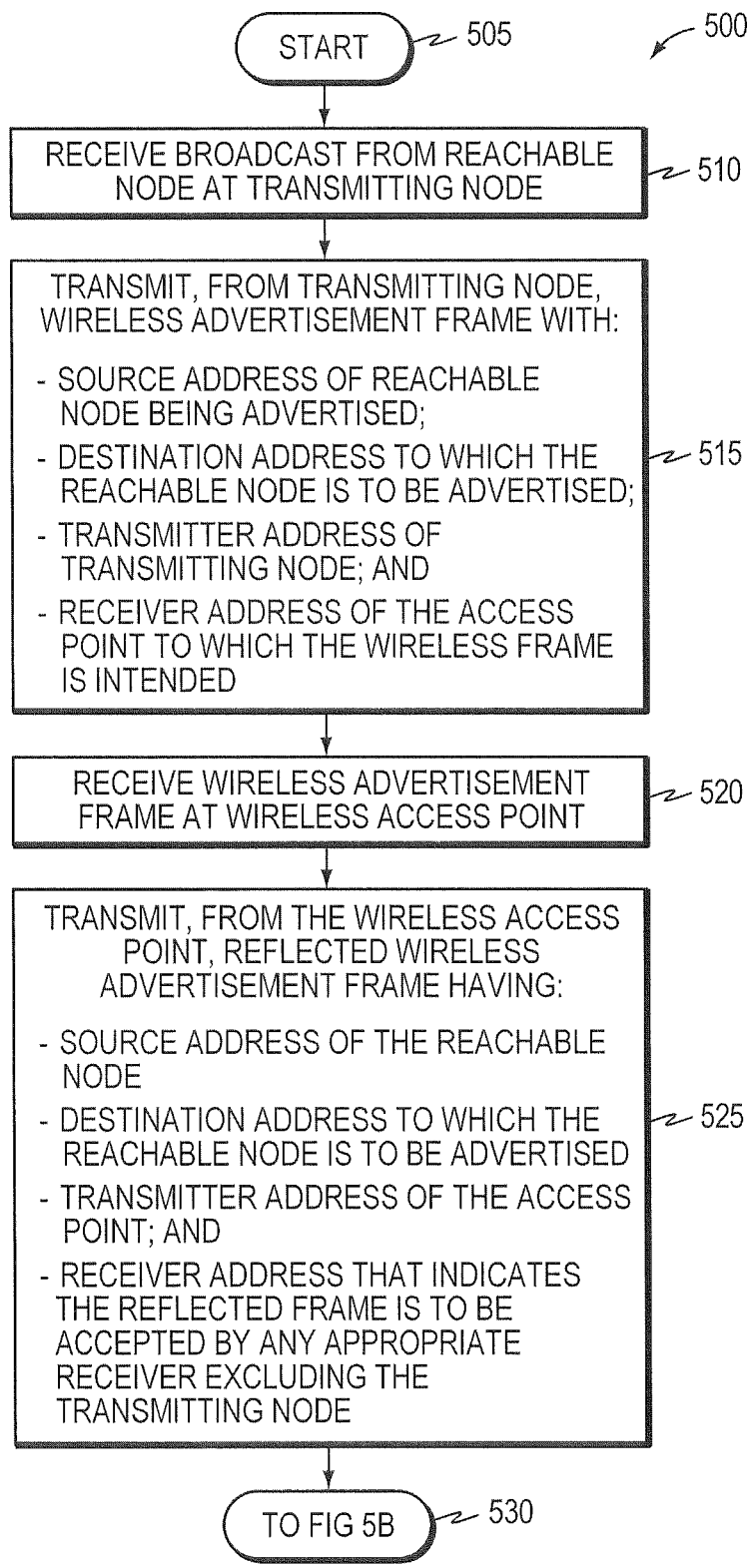
FIGS. 5A and 5B illustrate an example procedure for bridging wireless and wired media.

FIG. 5A illustrates an example procedure for bridging wireless and wired media in accordance with one or more embodiments described herein. The procedure 500 starts at step 505, and continues to step 510, where a transmitting node (e.g., bridge D) receives a broadcast from a reachable node (e.g., node Z). The transmitting node (bridge D) may then transmit a wireless advertisement frame 400a in step 415 onto wireless network media. In particular, the wireless advertisement frame 400a may comprise, as described above, a source address 410 of a reachable node being advertised (node Z), a destination address 420 to which the reachable node is to be advertised (e.g., broadcast), a transmitter address 430 of the transmitting node from which the wireless advertisement frame is received (bridge D), and a receiver address 440 of the access point to which the wireless frame is intended (e.g., an access point, bridge A).

In step 520, the wireless access point (bridge A) receives the wireless advertisement frame 400*a*, and in response, may transmit a reflected wireless advertisement frame 400*b* in step 525. In particular, as described above, the reflected wireless advertisement frame may comprise a source address 410 of the reachable node (node Z), a destination address 420 to which the reachable node is to be advertised (broadcast), a transmitter address 430 of the access point (bridge A), and a receiver address 440 that indicates the reflected frame 400*b* is to be accepted by any appropriate receiver excluding the transmitting node (e.g., multicast to any receiver, except bridge D). For instance, as mentioned above, the exclusion may include an association ID of the transmitting node (bridge D) in addition to a multicast address to which the remaining (i.e., non-bridge D receivers) may subscribe.

Figure 5B:
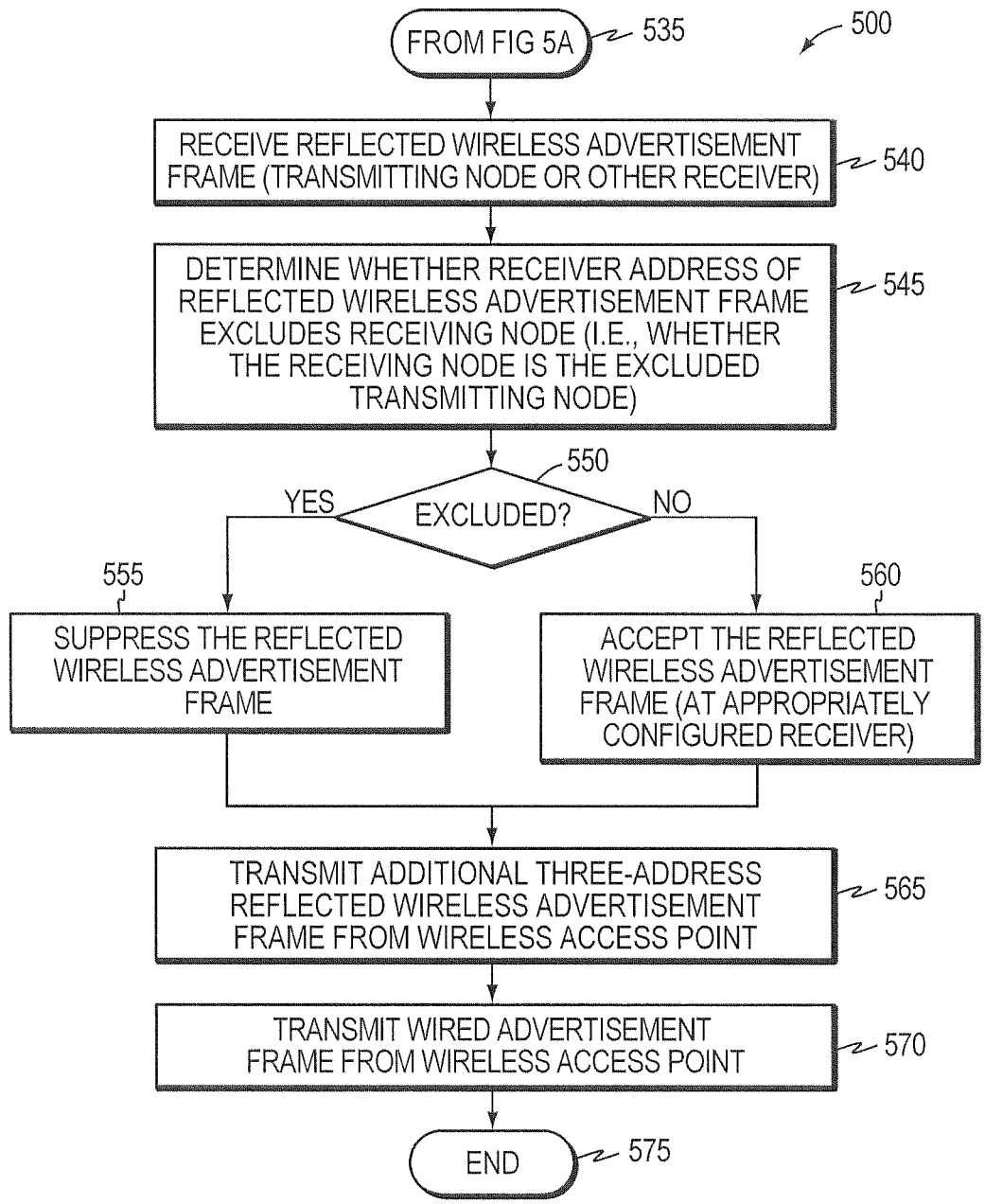

In step 530, the procedure 500 continues to FIG. 5B, which begins at step 535 (from FIG. 5A), and continues to step 540, where receivers (transmitting node/bridge D or other receivers, e.g., B, C, etc.) receive the reflected wireless advertisement frame 400*b*. In step 545, the receivers may determine whether the receiver address 430 of reflected wireless advertisement frame 400*b* excludes the receiving node, that is, whether the receiving node is the excluded transmitting node (bridge D). If the receiver is excluded in step 550 (i.e., the receiver is bridge D in the example), then in step 555, the receiver (transmitting node) suppresses the reflected wireless advertisement frame 400*b*. Conversely, if the receiver is not excluded in step 550, then in step 560, the receivers (not the transmitting node) may accept the reflected wireless advertisement frame 400*b*, e.g., as described above, having been an appropriately configured receiver.

As noted herein, certain networks 100 may comprise one or more nodes not configured to receive the four-address advertisement frames 400. If so, in step 565, the wireless access point may also transmit additional three-address reflected wireless advertisement frames. Also, should the access point be interconnected with one or more devices over physical links, in step 570 the access point may transmit wired advertisement frames over those physical links. The procedure 500 ends in step 575, having bridged wireless and wired media in the network 100.

Advantageously, the novel techniques described herein bridge wireless and wired media in a computer network. By defining and utilizing a fourth address field in wireless frames, particularly a receiver address that excludes the originating (to the wireless media) transmitting node, the novel techniques enable building a bridged network in which wireless media are interior links, as opposed to simply providing access to the network. In particular, the techniques described above may be embodied in a manner that is consistent with existing bridges and protocols (e.g., standards 802.1, 802.3, and 802.11). For instance, a wired station in a mixed wireless/wired network typically does not know that it is part of a mixed-media network. Therefore, introducing new procedures and protocols to correct deficiencies of the combination of 802.11, 802.1, and 802.3 is not appropriate. Moreover, the dynamic aspects of one or more embodiments described herein alleviate the need for cumbersome and inefficient manual configuration.

While there have been shown and described illustrative embodiments that bridge wireless and wired media in a computer network, it is to be understood that various other adaptations and modifications may be made within the spirit and scope of the present invention. For example, the embodiments have been shown and described herein with relation to various standardized protocols, such as 802.1, 802.3, and 802.11. However, the embodiments of the invention in their broader sense are not so limited, and may, in fact, be used with other suitable wired and/or wireless protocols.

Notably, while the one or more embodiments described herein define a particular format of the receiver address 420, other formats may be used in accordance with the techniques above. For instance, the order of multicast addresses and AIDs may be reversed, or any other format may be used that conforms to the wireless standards provided for the fourth receiver address 420, i.e., which devices should receive the associated frame. (For example, if the receiver address 420 were simply populated by the transmitting node's MAC address, e.g., Bridge D's, then the receiver address is not being used within the true meaning of the standardized fourth address, i.e., "who should receive this frame." Instead, the devices in the network 100 would have to be adjusted contrary to the meaning of the standards such that receiver address 420 refers to "everyone but this address should receive this frame." Using the techniques described herein, however, the meaning of the receiver frame is maintained, e.g., "who should receive this frame, except this device", thus accomplishing the suppression of own-multicasts while remaining within the scope of standardized protocols, e.g., 802.11.)

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:

receiving, at a node in a network, a four-address wireless advertisement frame comprising:
- a first source address field that indicates a reachable node being advertised,
- a first destination address field that indicates a destination to which the reachable node is to be advertised,
- a first transmitter address field that indicates a transmitting node from which the four-address wireless advertisement frame is received, and
- a first receiver address field that indicates one or more excluded nodes which are to be excluded from accepting a reflected wireless advertisement frame; and upon determining that the node is not one of the one or more excluded nodes, transmitting a three-address wireless advertisement frame comprising:
- a second source address field that indicates the reachable node being advertised, a second destination address field that indicates the destination to which the reachable node is to be advertised, and a second transmitter address field that indicates the node.

2. The method of claim 1, wherein the four-address wireless advertisement frame contains no more than four address fields and the three-address wireless advertisement frame contains no more than three address fields.

3. The method of claim 1, further comprising:
adding the node to the one or more excluded nodes to yield updated excluded nodes; and
upon determining that the node is not one of the one or more excluded nodes, further transmitting the reflected wireless advertisement frame comprising:
a third source address field that indicates the reachable node being advertised,
a third destination address field that indicates the destination to which the reachable node is to be advertised,
a third transmitter address field that indicates the node, and
a third receiver address that indicates the updated excluded nodes.

4. The method of claim 1, wherein the node is at least one of a wireless bridge or a wireless access point.

5. The method of claim 1, wherein upper bits of the first receiver address field are a fixed organization identifier (OID) and represent multicast addresses.

6. The method of claim 1, wherein lower bits of the first receiver address field correspond to the one or more excluded nodes.

7. The method of claim 1, further comprising:
upon determining that the node is one of the one or more excluded nodes, suppressing the four-address wireless advertisement frame.

8. A system comprising:
a processor; and
a non-transitory computer-readable storage medium storing instructions which, when executed by the processor, cause the processor to perform operations comprising:
receiving, via a network, a four-address wireless advertisement frame comprising:
a first source address field that indicates a reachable node being advertised,
a first destination address field that indicates a destination to which the reachable node is to be advertised,
a first transmitter address field that indicates a transmitting node from which the four-address wireless advertisement frame is received, and
a first receiver address field that indicates one or more excluded nodes which are to be excluded from accepting a reflected wireless advertisement frame; and
upon determining that the node is not one of the one or more excluded nodes, transmitting a three-address wireless advertisement frame comprising:
a second source address field that indicates the reachable node being advertised,
a second destination address field that indicates the destination to which the reachable node is to be advertised, and
a second transmitter address field that indicates the node.

9. The system of claim 8, wherein the four-address wireless advertisement frame contains no more than four address fields and the three-address wireless advertisement frame contains no more than three address fields.

10. The system of claim 8, the non-transitory computer-readable medium storing additional instructions which, when executed by the processor, cause the processor to perform further operations comprising:
adding the node to the one or more excluded nodes to yield updated excluded nodes; and
upon determining that the node is not one of the one or more excluded nodes, further transmitting the reflected wireless advertisement frame comprising:
a third source address field that indicates the reachable node being advertised,
a third destination address field that indicates the destination to which the reachable node is to be advertised,
a third transmitter address field that indicates the node, and
a third receiver address that indicates the updated excluded nodes.

11. The system of claim 8, the non-transitory computer-readable medium storing additional instructions which, when executed by the processor, cause the processor to perform further operations comprising:
generating three-address wireless advertisement frame based on the four-address wireless advertisement frame.

12. The system of claim 8, wherein upper bits of the first receiver address field are a fixed organization identifier (OID) and represent multicast addresses.

13. The system of claim 8, wherein lower bits of the first receiver address field correspond to the one or more excluded nodes.

14. The system of claim 8, the non-transitory computer-readable medium storing additional instructions which, when executed by the processor, cause the processor to perform further operations comprising:
upon determining that the node is one of the one or more excluded nodes, suppressing the four-address wireless advertisement frame.

15. A non-transitory computer-readable storage device storing instructions which, when executed by a processor, cause the processor to perform operations comprising:
receiving, at a node in a network, a four-address wireless advertisement frame comprising:
a first source address field that indicates a reachable node being advertised,
a first destination address field that indicates a destination to which the reachable node is to be advertised,
a first transmitter address field that indicates a transmitting node from which the four-address wireless advertisement frame is received, and
a first receiver address field that indicates one or more excluded nodes which are to be excluded from accepting a reflected wireless advertisement frame; and
upon determining that the node is not one of the one or more excluded nodes, transmitting a three-address wireless advertisement frame comprising:
a second source address field that indicates the reachable node being advertised,
a second destination address field that indicates the destination to which the reachable node is to be advertised, and a second transmitter address field that indicates the node.

16. The non-transitory computer-readable storage device of claim 15, storing additional instructions which, when executed by the processor, cause the processor to perform further operations comprising:
adding the node to the one or more excluded nodes to yield updated excluded nodes; and
upon determining that the node is not one of the one or more excluded nodes, further transmitting the reflected wireless advertisement frame comprising:
a third source address field that indicates the reachable node being advertised,
a third destination address field that indicates the destination to which the reachable node is to be advertised,
a third transmitter address field that indicates the node, and
a third receiver address that indicates the updated excluded nodes.

17. The non-transitory computer-readable storage device of claim 15, wherein the node is at least one of a wireless bridge or a wireless access point.

18. The non-transitory computer-readable storage device of claim 15, wherein upper bits of the first receiver address field are a fixed organization identifier (OID) and represent multicast addresses.

19. The non-transitory computer-readable storage device of claim 15, wherein lower bits of the first receiver address field correspond to the one or more excluded nodes.

20. The non-transitory computer-readable storage device of claim 15, storing additional instructions which, when executed by the processor, cause the processor to perform further operations comprising:
upon determining that the node is one of the one or more excluded nodes, suppressing the four-address wireless advertisement frame.

* * * * *